Jan. 26, 1965 C. A. FLARSHEIM 3,167,080
FLUID DELIVERY ASSEMBLY
Filed Dec. 10, 1962 2 Sheets-Sheet 1
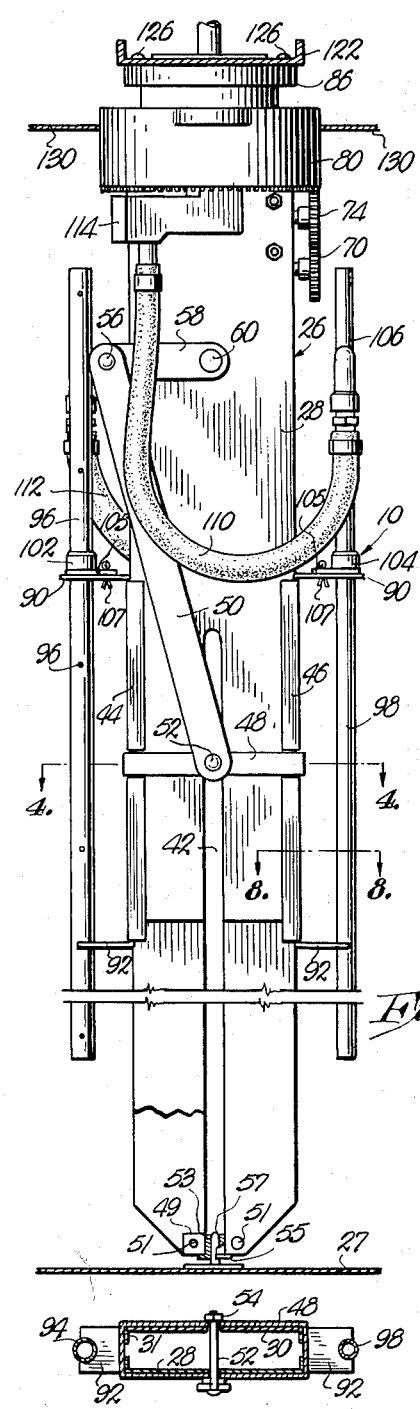
INVENTOR.
Clarence A. Flarsheim
BY
Hovey, Schmidt, Johnson & Hovey
ATTORNEYS.

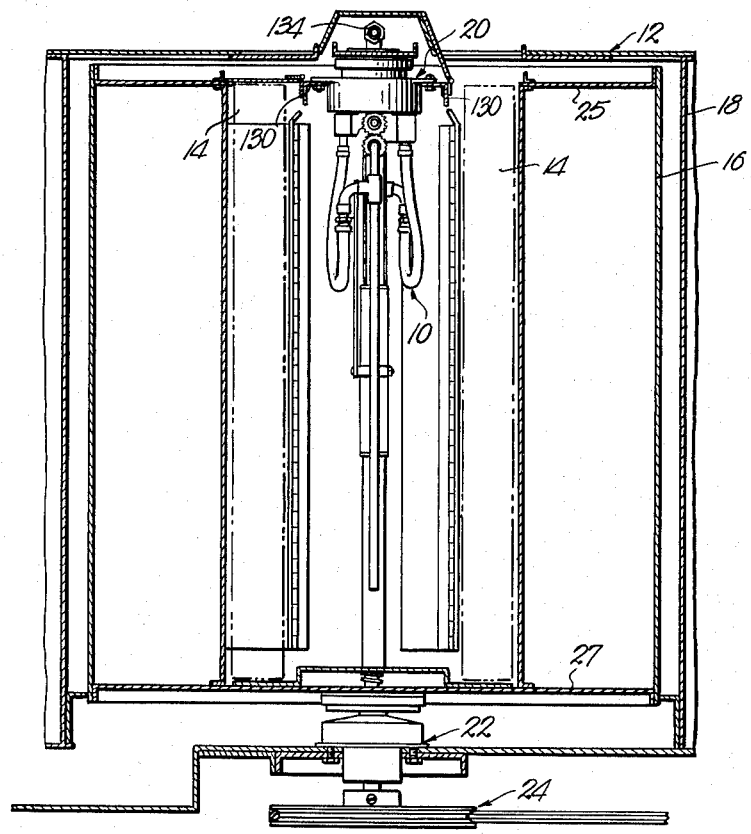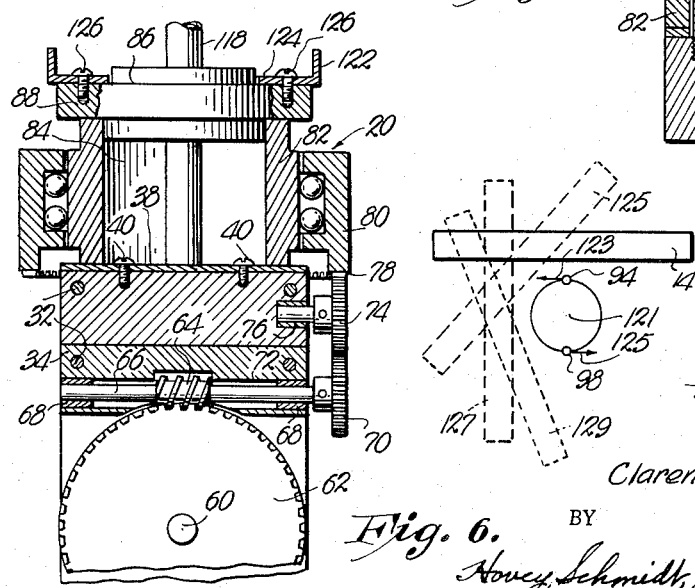

United States Patent Office 3,167,080
Patented Jan. 26, 1965

3,167,080
FLUID DELIVERY ASSEMBLY
Clarence A. Flarsheim, 6131 Mission Drive,
Shawnee Mission, Kans.
Filed Dec. 10, 1962, Ser. No. 243,288
14 Claims. (Cl. 134—144)

This invention relates to fluid delivery means, and more particularly, to structure for delivering cleaning and treating fluids under pressure toward and against a revolving member in the nature of a foraminous air filter.

The present application is a continuation-in-part of my copending application entitled "Filter Washing Machine and Method," Serial No. 96,892, filed March 20, 1961.

In my copending application, fluid delivery means in the nature of rotating swirlers was utilized for directing high pressure streams of a cleaning solution and an adhesive, such as oil, against a number of revolving objects such as foraminous air filters for successively cleaning and treating such filters. Although the swirlers utilized in the aforesaid machine have proven to be satisfactory in many respects for cleaning and treating such objects, it has been found that, by using the concepts of the present invention, air filters are more effectively cleaned and treated by virtue of the fact that the fluids directed against the filters more nearly contact substantially the entire areas exposed to the fluid streams.

The present invention, therefore, comprises a fluid delivery assembly which represents an improvement over the swirlers described in my copending application. This is accomplished by providing a number of reciprocating tubes having fluid delivery orifices for directing high pressure streams of cleaning and treating fluids over substantially the entire areas of the filters exposed to the fluid streams as the tubes reciprocate so that the fluids may penetrate substantially the entire mass of the filters as the latter are caused to revolve about the tubes.

It is, therefore, the primary object of the present invention to provide an improved fluid-delivery assembly which includes a number of reciprocating, fluid delivery tubes having orifices therein disposed for delivering streams of cleaning and treating fluids under pressure to a number of members revolving about the tubes, whereby the members are more effectively cleaned and treated than was heretofore possible by virtue of the fact that the fluids issuing from the orifices are capable of sweeping substantially the entire exposed area of each of the revolving members as the tubes reciprocate and as the members revolve about the tubes.

A further important object of the present invention is the provision of structure which permits the tubes to be mounted in positions to direct the fluid toward the members along lines which are substantially perpendicular to exposed faces thereof as the members revolve about a vertical axis and while the tubes reciprocate along paths of travel parallel to the axis of rotation of the members, whereby the pressure of the fluid and the effects of centrifugal force are more effectively utilized in the cleaning of the members.

Still another object of the present invention is the provision of structure which is operably coupled with the aforesaid tubes and which is adapted to be operably coupled with the apparatus for revolving the members, whereby the tubes may be reciprocated in response to the rotation of the members to thereby preclude the presence of an additional or external power source for effecting the reciprocation of the tubes.

A further object of the present invention is the provision of a fluid-delivery assembly including the aforesaid tubes which may be utilized with conventional bearing means having a stationary inner race and an outer race coupled with the apparatus for revolving the members so that the tubes may be supported by the inner race for reciprocation within the region circumscribed by the members without interference from nearby structure and may be operably coupled with the outer race in a manner to cause the reciprocation of the tubes, thus obviating additional support structure and power-actuation means for the assembly itself.

Yet another object of the present invention is the provision of a fluid-delivery assembly of the character described which includes structure for mounting the tubes adjacent the axis of revolution of the members with the orifices of the tubes disposed for directing fluids across the circular path of travel of the members so that the fluids contact substantially the entire exposed areas of the members as the latter revolve about the axis of revolution, and as the tubes reciprocate.

Although the preferred embodiment of the present invention is illustrated and described in connection with the filter washing machine which is the subject of my copending application, it is to be emphasized that the present invention need not be restricted to such use, but may be employed in other and similar devices which require the delivery of fluids under pressure to areas or regions surrounding or adjacent the fluid delivery means. For instance, the present invention may be utilized for spraying paint, aerosols, vapors or gases within confined areas for coating exposed surfaces of adjacent structural members, or for entraining such materials in the air in vapor or gaseous forms.

In the drawings:

FIGURE 1 is a side elevational view of the fluid delivery assembly which forms the subject of the present invention;

FIG. 2 is a fragmentary, end elevational view of the fluid-delivery assembly;

FIG. 3 is a cross-sectional view taken along line 3—3 of FIG. 2;

FIG. 4 is a cross-sectional view taken along line 4—4 of FIG. 1;

FIG. 5 is a cross-sectional view of a machine utilizing the fluid-delivery assembly of the present invention on a reduced scale for the purpose of cleaning and treating a pair of rotating members in the nature of foraminous air filters;

FIG. 6 is a cross-sectional, fragmentary view of a portion of the fluid-delivery assembly illustrating gear means for actuating the reciprocating linkage of the assembly for reciprocating the fluid delivery tubes;

FIG. 7 is a cross-sectional view taken along line 7—7 of FIG. 3;

FIG. 8 is a cross-sectional view taken along line 8—8 of FIG. 1; and

FIG. 9 is a schematic, top plan view of fluid delivery tubes forming a part of the instant invention illustrating the successive positions of a member to be cleaned and treated as the member revolves about the tubes.

The fluid-delivery assembly of the present invention includes a pair of elongated tubes plugged at the ends thereof and having a number of spaced orifices therein along the lengths thereof. A support in the nature of a pair of elongated, flat plates is adapted to be secured to stationary support structure within an enclosure capable of being revolved, the enclosure being disposed for receiving and supporting a number of members to be cleaned and treated. The tubes are slidably mounted uprightly on the plates for vertical reciprocation relative thereto. Reciprocating means in the nature of an elongated, shiftable linkage is carried by the plates and connected to the tubes through a pair of elongated elements slidable along opposed longitudinal edges of the plates.

Gear means is connected to the linkage, supported between the plates, and adapted to be operably coupled with the enclosure for shifting the linkage in response to the revolving of the enclosure to thereby vertically reciprocate the tubes so that the fluids issuing from the orifices in the tubes are directed across the circular path of travel of the members and caused to contact the exposed areas of such members in cleaning and treating relationship thereto.

The fluid-delivery assembly 10 in its preferred form, is utilized with a machine 12 for cleaning and treating a pair of foraminous members 14 in the nature of air filters or the like, as illustrated in FIG. 5. Members 14 are shown in dashed lines in positions on diametrically opposed sides of assembly 10 and within a cylindrical drum 16, the latter being in turn revolvably mounted within a stationary housing 18 by virtue of upper and lower bearing units 20 and 22 respectively. Power-actuated means 24 imparts rotation to bearing unit 22 to thereby revolve drum 16 about a vertical axis through the axis of revolution of drum 16. The revolution of drum 16 causes members 14 to revolve in a circular path about assembly 10.

Assembly 10 includes a support 26 comprising a pair of elongated, flat plates 28 and 30 as is clear in FIGS. 1, 2, 3, 4 and 8. A flange 31, as shown in FIGS. 4 and 8, is integral with each of said plates 28 and 30 and extends laterally therefrom along a corresponding longitudinal edge thereof. Flanges 31 add rigidity to plates 28 and 30. Plates 28 and 30 are spaced apart, are substantially parallel, and substantially span the distance between the top 25 and bottom 27 of drum 16. A pair of blocks 32 and 34 are disposed between plates 28 and 30 at one end of support 26 and fastening means 36 in the nature of machine screws interconnect blocks 32 and 34 with plates 28 and 30 to maintain the latter in parallel, spaced relationship throughout the lengths thereof. A circular plate 38 is secured by screws 40 to block 32 in the manner illustrated in FIG. 6.

Plates 28 and 30 are each provided with an elongated slot 42 therein at the end thereof opposite to the end in contact with blocks 32 and 34. Slots 42 extend inwardly to locations substantially midway between the ends of plates 28 and 30.

A pair of channel elements 44 and 46 contact plates 28 and 30 at opposed, longitudinal edges thereof as illustrated in FIGS. 1, 2 and 8. Each element 44 or 46 has opposed flanges which embrace the plates 28 and 30 in the manner shown in FIG. 8 while permitting the corresponding element to reciprocate relative to said plates. A continuous band 48 interconnects elements 44 and 46 intermediate the ends thereof as is clear in FIGS. 1 and 4. Notches are cut in elements 44 and 46 to accommodate band 48, it being clear that means is provided for rigidly securing band 48 to portions of elements 44 and 46 contacted by band 48. Elements 44 and 46 therefore, move in the direction of movement of band 48.

A block 49 is secured between plates 28 and 30 at the normally lower ends thereof by machine screws 51, and is provided with a bore thereof for receiving a bushing 53, as is clear in FIG. 1. Bushing 53 is preferably press-fitted within the bore of block 49 and is provided with an annular shoulder 55 thereon which abuts the lower face of block 49. Bushing 53 rotatably receives a pin 57 rigid to the bottom 27 of drum 16 so that plates 28 and 30 are stabilized when drum 16 rotates about assembly 10.

Means for reciprocating band 48 comprises an elongated linkage 50 pivotally secured at one end thereof to band 48 by a machine screw 52 or the like. Linkage 50 is secured to band 48 substantially midway between elements 44 and 46 as is clear in FIG. 1, and screw 52 passes through slots 42 in plates 28 and 30. A nut 54 maintains screw 52 in a fixed position with respect to band 48.

The opposite end of linkage 50 is pivotally secured by means of a pin 56 to the outermost end of an arm 58 secured to a shaft 60 journalled in plates 28 and 30. Shaft 60 spans the distance between plates 28 and 30 and is located intermediate block 34 and slots 42. Rotation of shaft 60 results in the rotation of arm 58 and, by virtue of the pivotal interconnections of linkage 50 with arm 58, and the pivotal connection between band 48 and linkage 50, band 48 reciprocates with respect to plates 28 and 30 as shaft 60 rotates. Reciprocation of band 48 results in the reciprocation of elements 44 and 46 with respect to plates 28 and 30.

A worm gear 62 is mounted on shaft 60 for rotation therewith. Gear 62 is located between plates 28 and 30 positioned in a manner to permit meshing with a worm 64 carried on shaft 66 journalled in block 34 by bearings 68 as is clear in FIG. 6. Shaft 66 extends outwardly from block 34 and plates 28 and 30 to mount a spur gear 70 on shaft 66.

A bore 72 is provided in block 34 to accommodate worm 64, shaft 66 and bearings 68. A spur gear 74 is journalled by means of a bearing 76 in block 32 at one end of the latter and meshes with gear 70 in the manner illustrated in FIG. 6. Gear 74 is positioned to mesh with a crown gear 78 which is affixed rigidly in any suitable manner to one end of the outer race 80 of bearing unit 20. The inner race 82 of of bearing unit 20 is illustrated in FIG. 6 within outer race 80 and is provided with an enlarged bore 84 therethrough. A cylindrical block 86 having an annular flange 88 thereon intermediate the ends thereof, is disposed within bore 84 with flange 88 thereof in contact with the end of inner race 82 opposite to the end adjacent crown gear 78. The opposite end of inner race 82 normally contacts the outer surface of plate 38 as is clear in FIG. 6.

Each element 44 and 46 is provided with a pair of laterally projecting ears 90 and 92 thereon as is clear in FIGS. 1, 2, 4 and 8. Ears 90 and 92 of element 44 are coupled with an elongated tube 94 having a number of spaced orifices 96 therein along the length thereof. Ears 90 and 92 of element 46 mount an elongated tube 98 having orifices 100 therein in spaced relationship along the length thereof. Tubes 94 and 98 are provided with enlargements 102 and 104 respectively, as is clear in FIG. 1. Enlargements 102 and 104 are each provided with an extension 105 which normally overlies a corresponding ear 90 and is removably secured thereto by a key 107. Ears 92 substantially surround tubes 94 and 98 in the manner illustrated in FIG. 8 so that tubes 94 and 98 at all times move with elements 44 and 46 respectively.

Tubes 94 and 98 are plugged at the ends and are provided with openings in fluid communication with the joints 104 in the manner shown in FIGS. 1 and 2. Elbows 108 interconnect joints 106 with a pair of flexible pipes 110 and 112 respectively, pipes 110 and 112 being in the nature of rubber hoses. Pipes 110 and 112 are coupled at the opposite ends thereof with adaptors 114 and 116 respectively connected to the face of plate 38 opposite to the face thereof contacted by race 82.

It is to be noted that plate 38 is provided with a pair of threaded openings therein in the manner illustrated in FIG. 7 for receiving a pair of tubes 118 and 120 respectively, shown in dashed lines in FIG. 2. Block 86 is also provided with a pair of openings alignable with the openings in plate 38 to accommodate tubes 118 and 120. Tubes 118 and 120 project through plate 38, and adaptors 114 and 116 are threadably coupled with tubes 118 and 120 in the manner illustrated in FIG. 7. Adaptors 114 and 116, while interconnecting pipes 110 and 112 with tubes 118 and 120, also space tubes 110 and 112 outwardly from plates 28 and 30 to prevent interference with the movement of linkage 50 and arm 58.

As shown in FIG. 9, tubes 94 and 98 are preferably positioned at equal distances from the axis of revolution 121 of members 14 on diametrically opposed sides of said axis. The directions of fluid issuing from tubes 94 and 98 are denoted by arrows 123 and 125, and it is evident that fluids are directed outwardly from each of tubes 94 and 98 along a tangent to the circle whose radius is equal to the radial distance between an orifice of one of the tubes and axis of revolution 121.

For purposes of illustration only, a single member 14 is shown in solid and dashed positions in FIG. 9, the solid line position denoting the location of the member 14 prior to moving into the path of travel of fluid issuing from tube 94 and the dashed line positions indicating the locations of member 14 as the latter revolves about axis 121.

As member 14 moves into the location denoted by the numeral 125, member 14 moves into the fluid issuing from tube 94 and the line along which the fluid is directed forms an acute angle with the exposed face of member 14. As member 14 moves into the location denoted by the numeral 127, the angle approaches 90°. As member 14 moves into the location denoted by the numeral 129, the angle again decreases and member 14 moves away from the fluid issuing from tube 94.

The pressure of the fluid from each of said tubes 94 and 98 is sufficient to direct the fluid through members 14 regardless of the angle between the direction of flow of the fluid and the exposed face of a member 14, so that members 14 are effectively and successively cleaned and treated by the fluids issuing from tubes 94 and 98 respectively.

Assembly 10 is operatively positioned so that plates 28 and 30 are in depending relationship to bearing unit 20 in the manner shown in FIG. 5. An elongated, flanged element 122, rigid to housing 18 in any suitable manner so that inner race 82 of bearing unit 20 is stationary with respect to drum 16, supports assembly 10 with tubes 94 and 98 within drum 16. As shown in FIG. 5, the interconnecting action of tubes 118 and 120 interconnects plate 38 and thereby plates 28 and 30 to block 86, which in turn is received within an opening 124 in element 122 and connected thereto by means of fastening means 126. Plates 28 and 30 are, therefore, stationary at all times during the operation of machine 12.

Outer race 80 is connected to drum 16 by interconnecting a pair of opposed flanges 128, FIG. 2, on outer race 80 to flanges 130 serving as portions of the top 25 of drum 16 as shown in FIG. 5. Tubes 118 and 120 are each provided with an elbow 134 which may be operably coupled to a source of fluid, it being clear that tube 94 is utilized for directing cleaning fluid toward and against members 14, while tube 98 is utilized for directing a treating fluid, such as an adhesive with an oil base, toward and against members 14.

It is to be noted that the fluids may be delivered successively to tubes 94 and 98 according to a predetermined timed sequence so that members may be successively cleaned and treated.

In operation, members 14 are disposed within drum 16 as shown in FIG. 5, and, when power-actuated means 24 is energized, drum 16 is caused to revolve with respect to housing 18, while outer race 80 is caused to rotate with respect to inner race 82. Rotation of outer race 80 results in the rotation of crown gear 78, spur gears 70 and 74, worm 64, worm gear 62, and arm 58. Rotation of arm 58 results in the vertical reciprocation of linkage 50, band 48 and elements 44 and 46. Tubes 94 and 98 reciprocate with elements 44 and 46 so that fluid issuing from the orifices of each of tubes 94 and 98, are directed against predetermined and coextensive portions of members 14 as the latter revolve about an axis through bearing units 20 and 22. The movements of tubes 94 and 98 are essentially parallel with the axis of rotation of drum 16, and the orifices 96 and 100 direct the corresponding fluids across the circular path of travel of members 14 as is clear in FIG. 9, so that members 14 move into the high pressure stream of fluids and are subsequently contacted thereby. In view of the large number of revolutions of members 14 in a given unit of time, the fluids issuing from orifices 96 and 100 substantially contact the entire exposed portions of members 14 to thereby assure a complete coverage of members 14 sufficient to effectively clean and treat the same.

The flexibility of pipes 110 and 112 permits tubes 94 and 98 to reciprocate uninterruptedly along paths parallel to the axis of revolution of drum 16.

The relative sizes of gears 70, 74 and 78 are selected so as to assure that a random coverage of members 14 by the fluids is attained during the operation of machine 12. Thus, an exact synchronization of the speeds of revolution of members 14 and the rates of vertical movement of tubes 94 and 98 is prevented to thereby preclude the occurrence of the situation wherein only certain portions of members 14 are covered by the fluids.

Having thus described the invention, what is claimed as new and desired to be secured by Letters Patent is:

1. Apparatus for delivering fluid toward and against a member revolvable about a central axis spaced therefrom, said apparatus comprising:

an elongated support adapted to be disposed adjacent said central axis and within the region circumscribed by said member;

a tube adapted to be operably coupled with a source of fluid under pressure and having a number of spaced orifices therein along the length thereof providing fluid outlets therefor;

an element carried by said support for reciprocating movement along the length thereof and secured to said tube for mounting the latter on said support for reciprocating movement substantially longitudinally of said central axis whereby fluid issuing from said orifices will be directed across the path of revolution of said member and against coextensive portions of the member as the latter moves into alignment with the orifices; and means coupled with said element for reciprocating the latter to thereby reciprocate said tube.

2. In a machine for treating a member revolvably mounted for movement about a central axis on supporting structure having a stationary part and a rotatable part, the improvement of which comprises means adapted to be disposed adjacent the central axis and within the region circumscribed by said revolving member for delivering a treating fluid toward and against said member to treat the latter, said means including:

a support including a plate adapted to be secured to said stationary part and to extend outwardly therefrom into said region adjacent the central axis;

a tube adapted to be operably coupled with a source of said fluid under pressure and having a number of spaced orifices therein along the length thereof providing fluid outlets therefor;

an elongated element slidably secured to the plate and having linkage means thereon, said tube being mounted on said element for movement therewith and thereby for reciprocating movement substantially parallel to said axis to permit fluid issuing from the orifices to be directed across the path of revolution of said member and to thereby be directed against coextensive, longitudinally extending portions of the member as the same move into alignment with the orifices; and means coupled with said linkage and adapted to be operably coupled with said rotating part for actuating said element to thereby reciprocate said tube in response to the revolution of said member.

3. In a machine as set forth in claim 2, wherein said element engages one longitudinal edge of said plate and is provided with a pair of ears thereon extending laterally thereon, said tube being secured to said ears in spaced relationship to said plate.

4. In a machine as set forth in claim 2, wherein is included a flexible pipe secured to said tube intermediate the ends of the latter and in fluid communication therewith, said pipe adapted to extend through said stationary part and to be operably coupled with said source of fluid.

5. In a machine as set forth in claim 2, wherein said support comprises an elongated plate, said actuating means includes a first gear adapted to be secured to said rotating part, a second gear mounted on said plate and coupled with said reciprocating means, and a third gear carried by the plate and interconnecting said first and second gears.

6. In a machine as set forth in claim 5, wherein is included a shaft rotatably mounted on said plate, said second gear comprises a worm gear mounted on said shaft for rotation therewith, said third gear including a worm operably coupled with said worm gear.

7. In a machine as set forth in claim 6, said reciprocating means including an elongated linkage, said tube being operably coupled with said linkage, and including an arm coupled at one end thereof with said shaft and extending outwardly therefrom, said linkage being pivotally secured to the opposite end thereof to said arm, whereby said linkage and thereby said tube is reciprocated as said arm is rotated under the influence of said worm gear.

8. In a machine for cleaning and treating an elongated member revolvably mounted uprightly for movement about a vertical axis on supporting structure having bearing means thereon including a stationary inner race and a rotatable outer race, the improvement of which comprises means adapted to be disposed adjacent said axis and within the region circumscribed by said revolving member for successively delivering cleaning and treating fluids toward and against said member to thereby clean and treat the latter, said means including:
- a pair of elongated, spaced, generally parallel plates each adapted to be secured at one end thereof to said inner race and to extend outwardly therefrom into said region;
- a pair of tubes each having a number of spaced orifices therein along the length thereof providing fluid outlets therefor;
- a flexible pipe for each tube respectively and connected thereto in fluid communication therewith, said pipes being adapted for extending through said inner race and adapted to be operably coupled with sources of cleaning and treating fluids respectively;
- an elongated tube-supporting element for each tube respectively, said elements being slidably mounted on said plates adjacent corresponding and opposed longitudinal edges thereof;
- an elongated linkage coupled at one end thereof with said elements;
- a first shaft rotatably carried by said plates;
- an arm secured at one end thereof with said first shaft for rotation therewith, said linkage being secured at the opposite end thereof to the outer end of said arm;
- a worm gear carried by said first shaft between said plates for rotation with said first shaft;
- a second shaft rotatably mounted on said plates;
- a worm carried by said second shaft and being operably coupled with said worm gear;
- a spur gear mounted on said second shaft in spaced relationship to said worm; and
- a crown gear adapted to be secured to said outer race for rotation therewith, said spur gear being operably coupled with said crown gear for rotating said worm gear to thereby reciprocate said tubes responsive to the revolution of said member.

9. In a machine as set forth in claim 8, wherein is included an elongated, element coupling member, said linkage being pivotally mounted at said one end thereof on said coupling member intermediate the ends of the latter.

10. In a machine as set forth in claim 8, wherein said tubes are adapted to be disposed equidistantly from and on diametrically opposed sides of said vertical axis with the direction of fluids issuing from the orifices thereof being tangent to the circle having a diameter equal to the distance between said tubes.

11. In combination:
- support structure;
- a drum adapted to receive a number of members to be cleaned and provided with an opening therein;
- means coupled with said structure and said drum for mounting the latter on said structure for rotation about the axis of revolution of the drum, said members adapted to be disposed within said drum in spaced relationship to said axis;
- power-actuated means for rotating said drum; and
- fluid delivery means carried by said structure and extending into said drum through said opening therein for directing fluid against said members as said drum is rotated, said fluid delivery means including a plate, a tube having a fluid delivery orifice therein mounted on said plate for reciprocation relative thereto along a path of travel parallel to said axis, and reciprocating means carried by said plate and coupled with the tube for reciprocating the latter relative to said plate, said reciprocating means being operably coupled with said drum and being actuatable responsive to the rotation of the drum.

12. The combination as set forth in claim 11, wherein said plate is provided with bushing structure thereon adjacent one end thereof, said drum being provided with a pin thereon extending into said bushing structure for stabilizing said plate as said drum is rotated.

13. In combination:
- support structure;
- an enclosure having means therein presenting a number of compartments each adapted for receiving a member to be treated;
- means mounting said enclosure on said support structure for rotation relative to the latter to thereby rotate the members in said compartments, the latter being spaced from the axis of rotation of the enclosure;
- means coupled with said enclosure for rotating the same;
- a fluid delivery tube having a plurality of spaced fluid discharge orifices along the length thereof and adapted to be operably coupled with a source of fluid;
- means mounting said tube on said enclosure for reciprocation longitudinally of said axis of rotation and within the region circumscribed by the members as the latter rotate with said enclosure; and
- means coupled with said tube for reciprocating the latter in response to the rotation of said enclosure.

14. The combination as set forth in claim 13, wherein said orifices are in longitudinal alignment, said tube being on one side of said axis and disposed to direct fluid toward a rotating member as the latter moves from a position on said one side of the axis to a position substantially perpendicular to the flow of fluid from said orifices.

References Cited in the file of this patent

UNITED STATES PATENTS

| | | |
|---|---|---|
| 1,256,599 | Schoop | Feb. 19, 1918 |
| 1,281,672 | Schorn | Oct. 15, 1918 |
| 1,628,317 | Hoevel | May 10, 1927 |
| 2,336,946 | Marden | Dec. 14, 1943 |
| 2,893,410 | Frekko | July 7, 1959 |
| 3,052,245 | Nagle | Sept. 4, 1962 |